United States Patent [19]
Scholl

[11] 3,810,350
[45] May 14, 1974

[54] U-SHAPED FLUID TREATING FILTER
[75] Inventor: Howard O. Scholl, Louisville, Ky.
[73] Assignee: American Air Filter Company, Inc., Louisville, Ky.
[22] Filed: Apr. 24, 1972
[21] Appl. No.: 246,780

[52] U.S. Cl............. 55/487, 55/493, 55/500, 55/527
[51] Int. Cl........................................... B01d 27/00
[58] Field of Search ............ 55/486, 487, 490, 493, 55/500, 508, 513, 514, 527, 528; 40/125 F; 160/229

[56] References Cited
UNITED STATES PATENTS
| | | | |
|---|---|---|---|
| 579,769 | 3/1897 | Pich | 210/493 |
| 2,493,257 | 1/1950 | Malme | 55/492 |
| 2,806,526 | 9/1957 | Marcus | 160/229 R |
| 3,218,784 | 11/1965 | Greiner | 55/493 |
| 3,494,113 | 2/1970 | Kinney | 55/486 |
| 3,526,557 | 9/1970 | Taylor, Jr. | 55/487 |

Primary Examiner—Bernard Nozick

[57] ABSTRACT

An improved air filter of U-shaped configuration including a wire frame of generally U-shaped configuration and a mat of flexible filter material substantially coextensive with the wire frame, the wire frame including pivot means at the juncture of the sides with the base of the U-shaped frame to allow collapsing of the filter to a flat package, the filter including hook means for removably mounting of the filter in an air processing unit.

8 Claims, 3 Drawing Figures

PATENTED MAY 14 1974

3,810,350

U-SHAPED FLUID TREATING FILTER

BACKGROUND OF THE INVENTION

This invention relates to an improved U-shaped fluid treating filter construction and, more particularly, a novel U-shaped wire frame structure for supporting mats of flexible materials in an air processing unit.

In the conditioning of air in air conditioners, furnaces, and the like, the air to be processed is usually passed through a filter to remove particles of dust and other foreign materials. These filters come in many sizes and shapes and are constructed by many different methods, the sizes and shapes of these filters being dependent upon specific processing units in which they are to be mounted as well as the various types and shapes of housings in which these filters are to be received. For example, in one particular air processing unit, a filter of generally U-shaped configuration is required. Furthermore, in many of these air processing units which utilize U-shaped filters, inexpensive filters that may be thrown away when they become clogged or dirty are used.

SUMMARY OF THE INVENTION

In the present invention, it is recognized that it is desirable to provide a U-shaped filter which is inexpensive, but yet durable for mounting in present air processing units of the type requiring a U-shaped filter assembly. Furthermore, it is recognized that it is desirable to provide a filter which is easily constructed. Also, it is recognized that the cost of transporting of light weight filter assemblies from the manufacturer to the point of use is relatively high in relation to the cost of manufacturing of inexpensive throwaway light weight filters and that it is desirable to provide a filter of a U-shaped configuration which may be foldable or collapsible to a flat package for shipment thereby maximizing the number of filters that may be shipped in a given volume load.

The present invention advantageously provides a straightforward arrangement in the preparation of an inherently structurally stable filter which may be utilized in air processing units requiring an air filter of U-shaped configuration. The present invention further provides a U-shaped filter assembly which may be folded or collapsed in a flat package for shipment.

Various other features of the present invention will become obvious to those skilled in the art upon reading the disclosure set forth hereinafter.

More particularly, the present invention provides a generally U-shaped filter assembly adapted to be removably mounted in an air processing unit having receiving means for a generally U-shaped filter assembly comprising a wire frame of generally U-shaped configuration including a base portion and two side portions, the base and the side portions being of a preselected size sufficient to support a fibrous filter media in operating position, the side portions being pivotally attached to the base portion at opposite ends of the base portions; a mat of flexible filter material substantially coextensive with the wire frame; and, mounting means attached to the wire frame adaptable for removably mounting in an air processing unit.

It is to be understood that the description of the examples of the invention given hereinafter are not by way of limitation and various modifications within the scope of the present invention will occur to those skilled in the art upon reading the disclosure set forth hereinafter.

Referring to the drawing.

Figure 1:
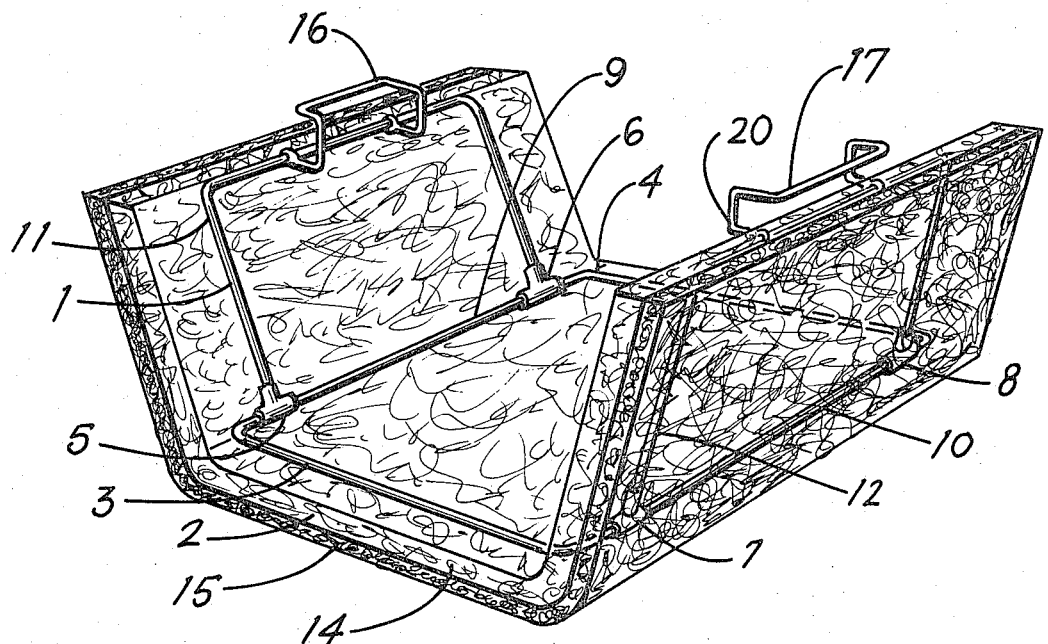
FIG. 1 is a perspective view of a filter of the present invention.

FIG. 1 of the drawing illustrates one structure of a U-shaped filter assembly of the present invention. The U-shaped filter assembly illustrated in the Figure includes a wire frame 1 and a mat of flexible filter material 2, such as fiberglas, attached thereto. Attaching the filter material 2 to the wire 1 may be by any known means, such as, for example, an adhesive.

The wire frame 1 includes a base portion and two side portions, the side portions being at opposite ends of the base portion forming a generally U-shaped frame when the sides are perpendicular to the base. The base portion of frame 1 is composed of two parallel wires 3 and 4 having inwardly turned extremities attached to pivotable members 5 and 6, respectively, at one set of facing extremities, and pivotable members 7 and 8 at the opposite set of facing extremities of the base. The pivotable members 5, 6, 7, and 8, as illustrated, are of T-shaped configuration with apertures or indentations in each end of the T wherein each aperture or indentation is adaptable for receiving elongated wires therein in friction tight communication therewith. Base portion of wire frame 1 further includes a transversely extending wire 9 at one end and a transversely extending wire 10 at the other end, the wires 9 and 10 being at the juncture of the base portion with the side portions. Wires 9 and 10 are in communication with longitudinally extending wires 3 and 4 through T-shaped pivotable members 5, 6, 7, and 8, the pivotable members 5, 6, 7, and 8 being adaptable for receiving wires 9 and 10 therein.

Frame 1 further includes on one side of the base portion a U-shaped side wire 11, side wire 11 being adaptable for insertion into T-shaped pivotable members 5 and 6. On the opposite side of the base portion of wire frame 1 is a second U-shaped side wire 12, side wire 12 being adaptable for insertion into T-shaped pivotable members 7 and 8.

Figure 2:
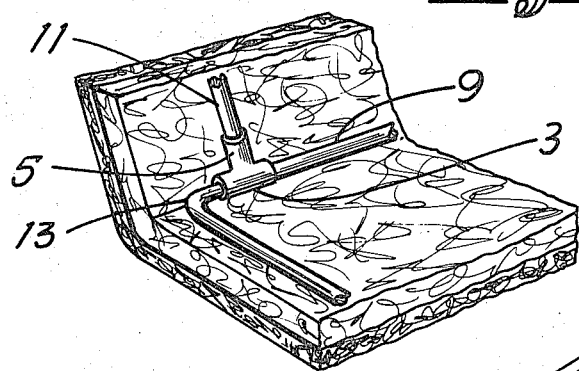
FIG. 2 is an enlarged, partially cutaway, perspective view of the filter of FIG. 1 illustrating the juncture of one side with the base of the frame.

FIG. 2 shows that base wire 3 includes an inwardly extending tab 13 which is adaptable for inserting into T-shaped pivotable member 5 thereby allowing for pivotable movement of the side portion including the U-shaped side wire 11 about the axis formed by transversely extending base wire 9 and inwardly extending tab 13, the side portion including the U-shaped side wire 11 being rotatable toward or away from the base portion including longitudinally extending base wire 3 and transversely extending base wire 9. FIG. 2 shows only one pivotable connection of the base portion with a side portion. It is realized that pivots 6, 7, and 8 are adaptable for communicating with the base wires 9 and 10 and side wires 11 and 12 in the same general manner as the communication between pivot 5 and wires 9, 11 and 13. It is further realized that the T-shaped pivotable members 5, 6, 7, and 8 of the example are only one means of illustrating the means for pivoting the side portions toward or away from a base portion of the filter assembly. L-shaped pivots with openings at the extremity of each leg in addition to an opening at the juncture of the leg portions, the pivots being adaptable for receiving base and side wires in each opening in friction tight communication therewith for pivoting side portions toward or away from base portions are also incorporated as examples of pivotable means in the present invention. It is even further realized that the base wires 3, 4, 8 and 9 may be of unitary construction forming a rectangular-shaped base portion wherein the pivotable members are snapped onto the base portion in friction tight communication therewith at the corners thereof without departing from the spirit and scope of the present invention.

Filter media 2 of the present example is of unitary construction comprising a first portion or concentration 14 and a second portion or concentration 15. It is realized that filter media 2 may be composed of only one concentration of fibers. However, one preferred fibrous material is one having two portions of different concentrations of filaments wherein the portion having the highest concentration of filaments is sufficient to support itself in operating position or at least in combination with a wire frame is sufficient for retaining itself in operating position. One method of making a unitarily constructed fiber mat having at least two different concentrations of filaments in a non-woven fibrous mat is described in U.S. Pat. No. 3,526,557.

Figure 3:
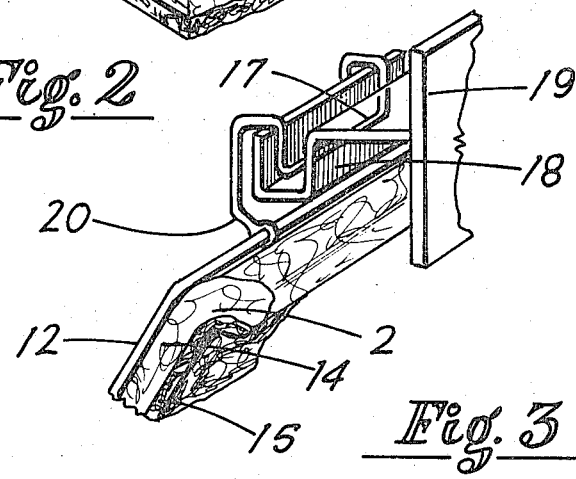
FIG. 3 is an enlarged, partially cutaway, perspective view illustrating the mounting of the U-shaped filter assembly of FIG. 1 in an air processing unit.

FIG. 3 illustrates one means of mounting the filter assembly of the present invention in an air processing unit having means for receiving filters of generally U-shaped configuration. U-shaped wire hooks 16 and 17 are pivotally attached to the base portion of the U-shaped side wires 11 and 12, respectively, hooks 16 and 17 being for engagement with an upwardly open support channel member 18, channel member 18 being attached to the wall 19 of an air processing unit. Hooks 16 and 17 are provided with inwardly extending lip portions, such as lip 20 of U-shaped hook 17, whereby upon engagement of the hook 17 with channel member 18, lip 20 abuts the underside of the channel 18 holding the filter assembly securely in place. FIG. 3 further shows that the filter media 2 extends beyond the base portion of the U-shaped side wire 12 so that when hook 17 is received by channel member 18 filter media 2 is pressed against the underside of the channel member 18 thereby providing for a gas flow-through seal.

In packaging a filter assembly of the present invention, as described above, one side of the filter assembly can be rotated toward the base of the filter until it comes into complete contact with a top of the base and the opposite side can be rotated away from the base or towards the underside of the base thereby giving a collapsed Z-shaped configuration.

In the installation of a filter assembly of the present invention merely unfolding the collapsed filter assembly and forming it into a U-shaped cofiguration with the wire frame being on the inside of the filter and then engaging the U-shaped hooks 16 and 17 with their respective channel shaped receivers, such as receiver 18, is all that is necessary. The inwardly extending portion or lip 20 of the inwardly extending U-shaped hook 17 abuts the underside of the channel 18 holding the filter assembly securely in the air processing unit. In removing the filter assembly from the unit it is only necessary to rotate the hook means 16 and 17 out of and away from channel member 18. Thus, it is seen that the filter assembly is positively retained in the air processing unit and may be easily and conveniently removed from the unit when necessary.

It will be realized that various changes may be made to the specific embodiment as shown and described without departing from the principles and spirit of the present invention.

I claim:

1. A generally U-shaped filter assembly adapted to be removably mounted in an air processing unit having receiving means for a generally U-shaped configuration including a base portion of substantially rectangular configuration formed of wires including side and end wires and two side wire portions of substantially U-shaped configuration said base portion and said side portions being of a size sufficient to support filter media in an operating position, said side portions including means pivotally attaching opposed wires of said base portion to said side wire portions to define said U-shaped wire frame;

a mat of flexible filter material substantially coextensive with and attached to said wire frame; and, mounting means attached to said side wire portions of said wire frame along sides of said side portions opposite said pivotally attachment with said base portion, said mounting means being for engageable mounting with support means in an air processing unit.

2. The generally U-shaped filter assembly of claim 1 wherein said mat of flexible filter material is of unitary construction having at least two portions of different concentrations of filaments.

3. The generally U-shaped filter assembly of claim 1 wherein said mounting means are generally U-shaped hooks pivotally attached to said side portions, said hooks being adaptable for engagement with an upwardly open support channel member, said channel member being attached to a wall in an air processing unit.

4. The generally U-shaped filter assembly of claim 3 wherein said mat of flexible filter material extends outwardly past said hooks whereby upon engagement of said hooks with said channel member, the outwardly extended portion of said filter material is pressed against said channel member providing a gas flow-through seal.

5. The generally U-shaped filter assembly of claim 1 wherein said wire frame includes a base portion of at least a pair of generally parallel longitudinally extending base wires, and two side portions, each side portion having a generally U-shaped wire, each of said U-shaped wires being pivotably attached to each of said parallel longitudinally extending base wires.

6. The generally U-shaped filter assembly of claim 5 wherein said base portion includes at least a pair of generally parallel transversely extending base wires disposed between and engaging with said longitudinally extending base wires, said transversely extending wires forming edges of said base portion.

7. The generally U-shaped filter assembly of claim 6 wherein said transversely extending base wires and said longitudinally extending base wires are in engagement at their extremities with extremities of said U-shaped side wires.

8. The generally U-shaped filter assembly of claim 7 including a plurality of generally T-shaped pivots with indentations in each end of said pivot for receiving extremities of said wires, each T-shaped pivot being in friction tight communication with one end of a transversely extending base wire, one end of a longitudinally extending base wire, and one extremity of a U-shaped side wire.

* * * * *